Dec. 4, 1962 F. A. O'NIANS ETAL 3,067,421
REFLECTOR FOR TWO LINEAR ARRAYS PRODUCING
DIRECTIVITY IN TWO ANGULAR DIRECTIONS
Filed June 26, 1961

PRIOR ART

INVENTORS
Frank Anderson O'Nians
and
Mervyn James Crumpen
BY Baldwin & Wight
ATTORNEYS

United States Patent Office 3,067,421
Patented Dec. 4, 1962

3,067,421
REFLECTOR FOR TWO LINEAR ARRAYS PRODUCING DIRECTIVITY IN TWO ANGULAR DIRECTIONS
Frank Anderson O'Nians, Mountain View, Calif., and Mervyn James Crumpen, Chelmsford, England, assignors to Marconi's Wireless Telegraph Company Limited, London, England, a company of Great Britain
Filed June 26, 1961, Ser. No. 119,735
4 Claims. (Cl. 343—779)

This invention relates to aerial systems and more specifically to directive linear aerial systems adapted to have directivity in either of two angularly related directions with a predetermined angle between them. This application is a continuation-in-part of our application Serial Number 747,665, filed July 10, 1958, now abandoned.

The invention is particularly well adapted to the provision of aerial systems for use in airborne radio speed and drift indicator installations of the Doppler type although not limited to its application thereto. In such installations, as is now well known, speed and/or drift is indicated by transmitting radio energy downwardly from the aircraft and receiving and phase or time comparing the energies in order to ascertain aircraft speed and drift, since the Doppler frequency changes produced in the reflected energies will depend upon speed and drift. In such installations it is common to use linear directive aerial systems which can be switched at will to transmit and/or receive in different directions downwardly. The present invention, which may be used with advantage in radio speed and drift indicator installations of the Doppler type, seeks to provide improved directive linear aerial systems of high efficiency and gain and with relatively small overall dimensions as compared to those at present usually employed.

Figure 1:
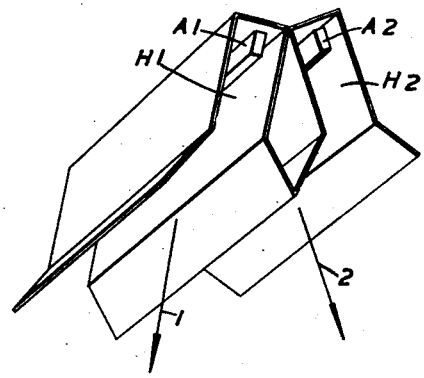
Figure 2:
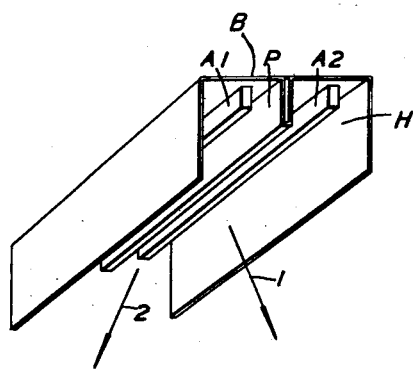

The invention is illustrated in and further explained in connection with the accompanying drawings in which:

FIG. 1 is a perspective schematic view, provided for purposes of explanation, of a known directive linear aerial system suitable for use in a radio speed or drift indicating installation for aircraft; and FIG. 2 is a similar view of an embodiment of this invention suitable for the same use.

Referring to FIG. 1, the known aerial system illustrated therein is required to transmit and/or receive at will in either of two angularly related directions represented by the two arrows 1 and 2. The aerial system consists of two hoods H1 and H2 arranged side by side and as close together as possible. The hoods are "aimed" in the desired directions indicated by the arrows, and each houses, in its base, a linear aerial of the known slotted waveguide type. These aerials are indicated at A1 and A2. For simplicity of drawing the slots in the guides are not shown. When it is desired to transmit or receive in direction 1, the aerial A1 is connected to the associated apparatus (not shown) and when it is desired to transmit or receive in the other direction 2, aerial A2 is connected to the associated apparatus.

This type of arrangement has the serious disadvantage that only one hood is in use at a time so that the space occupied by the whole system is comparatively large and the aerial gain is small. Moreover, there is obviously a practical limit to the closeness to which the hoods can be brought to one another and this has an adverse effect upon the design as a whole. The present invention seeks to improve upon a known arrangement as shown in FIG. 1 as respects areial gain and space occupation.

In accordance with one illustrative embodiment of this invention, a single reflector hood is provided with a pair of linear aerials positioned side by side and spaced a predetermined distance apart in the base of the reflector hood. Preferably the hood has parallel sides and is advantageously provided with a wall or partition located centrally between the linear aerials and centrally between the sides of the hood. Also advantageously, the projection of this wall or partition beyond the aerials should be substantially in the range of from $0.15\lambda$ to $0.25\lambda$, where $\lambda$ is the operating wavelength of the aerials. It is an important feature of this invention that the side walls of the hood extend beyond the central partition.

In this illustrative embodiment, the linear aerials advantageously comprise slotted waveguides in which a narrow face of the waveguide is fixed to the base of the hood. Preferably, the height of the wall or partition between the waveguides is approximately one and one quarter times the height of the slotted face of the waveguides from the hood base, i.e. one and one quarter times the broad face of the guides.

FIG. 2 shows, in manner similar to that adopted for FIG. 1, a preferred embodiment of the present invention. As will be seen, there is now only a single hood H which is parallel sided and in the base of this are mounted side by side and symmetrically with respect to the center line of the hood, two linear aerials A1, A2 of the slotted waveguide type. Between the two aerials and upstanding from the center line of the base of the hood is a metal wall or partition P which extends beyond the outer faces of the waveguides A1, A2 a distance in the range of $0.15\lambda$ to $0.25\lambda$, where $\lambda$ is the operating wavelength of the aerials. Preferably the height of partition P is approximately one and one quarter times the height of the slotted face of the waveguides A1 and A2 measured from the base B of the hood H.

The aerial system of FIG. 2 makes considerably more efficient use of the available aerial aperture than does the known system of FIG. 1 and has better gain. When one of the aerials A1 is energized, the main lobe of the polar diagram is directed away from the normal to the aperture by a certain angle in a direction away from the side wall of the hood which is adjacent the energized guide. When the other aerial is energized the main lobe of the polar diagram is directed by a similar angle away from the normal to the aperture in a direction away from the other side wall of the hood. Thus energization of the aerial A1 produces directivity as indicated by the arrow 1 and energization of the aerial A2 produces directivity as indicated by the arrow 2. The angle between each of the arrows 1 and 2 and the normal to the aperture, i.e. the plane of the wall P, depends upon the spacing of the two aerials A1 and A2. If these aerials are brought close together, one close on each side of the parition P, the angle may be made as little as 5° or thereabouts. If the aerials are separated as much as possible, so that they are close to the side walls of the hood, the angle may be made as much as 30°. The partition P serves to reduce or suppress unwanted side lobes in the polar diagram and thus increases the effective gain. The height of the center wall, i.e., its dimension measured from the base B of the hood H, is approximately equal to one and one quarter times the height of each of the two aerials. The height of the side walls is greater than that of the central partition, P.

Experimental test with an arrangement as illustrated in FIG. 2 has shown that, simple and compact though it is, it gives considerable improvement in gain over an arrangement as shown in FIG. 1. Thus, with a single hood as shown in FIG. 2 having a width of $2.8\lambda$ (where $\lambda$ is the working wavelength) replacing a double hood construction as shown in FIG. 1 with each hood $1.4\lambda$ wide, an increase in gain of 2½ dbs was obtained where the hood depth (in both cases) was $2.6\lambda$; the increase of gain was 4 dbs when the hood depth (again in both cases) increased to 3.4λ.

While we have shown only one illustrative embodiment of this invention, it is understood that the concepts thereof could be applied to other embodiments without departing from the spirit and scope of this invention.

We claim:

1. A directive linear aerial system adapted to have directivity in either of two angularly related directions with a predetermined angle between them, said system comprising two linear aerials mounted side by side and spaced apart in the base of a single reflector hood, and a partition upstanding from the base of the hood along substantially the entire length thereof and positioned centrally both between said aerials and between the sides of said hood, said partition extending beyond said aerials in the direction of the mouth of the hood a distance substantially in the range of 0.15λ to 0.25λ, where λ is the operating wavelength of said aerials.

2. A directive linear aerial system adapted to have directivity in either of two angularly related directions with a predetermined angle between them, said system comprising two linear aerials mounted side by side and spaced apart in the base of a single reflector hood, and a partition upstanding from the base of the hood along substantially the entire length thereof and positioned centrally both between said aerials and between the sides of said hood, said partition extending in the direction of the mouth of the hood a distance approximately one and one quarter times the height of each of said aerials, the sides of said hood extending beyond said partition.

3. A directive linear aerial system adapted to have directivity in either of two angularly related directions with a predetermined angle between them, said system comprising two linear waveguides mounted side by side and spaced apart in the base of a single reflector hood having parallel sides, with their narrow faces toward said hood, and a partition upstanding from the base of the hood along substantially the entire length thereof and positioned centrally both between said waveguides and between the sides of said hood, said partition extending in the direction of the mouth of the hood a distance approximately one and one quarter times the dimension of the broad face of said waveguides.

4. A directive linear aerial system adapted to have directivity in either of two angularly related directions with a predetermined angle between them, said system comprising two linear waveguides mounted side by side and spaced apart in the base of a single reflector hood having parallel sides, and a partition upstanding from the base of the hood along substantially the entire length thereof and positioned centrally both between said waveguides and between the parallel sides of said hood, said partition extending beyond said waveguides in the direction of the mouth of the hood a distance substantially in the range of 0.15λ to 0.25λ where λ is the operating wavelength of said waveguides, the sides of said hood extending beyond said partition.

No references cited.